Aug. 6, 1963

A. P. FRAAS 3,100,187

REFLECTOR FOR NEUTRONIC REACTORS

Filed May 3, 1961

INVENTOR.
Arthur P. Fraas
BY

ATTORNEY

Aug. 6, 1963 A. P. FRAAS 3,100,187
REFLECTOR FOR NEUTRONIC REACTORS
Filed May 3, 1961 3 Sheets-Sheet 2

INVENTOR.
Arthur P. Fraas
BY
*Roland A. Anderson*
ATTORNEY

INVENTOR.
Arthur P. Fraas
BY
Roland A. Anderson
ATTORNEY 3,100,187
REFLECTOR FOR NEUTRONIC REACTORS
Arthur P. Fraas, Knoxville, Tenn., assignor to the United States of America as represented by the United States Atomic Energy Commission
Filed May 3, 1961, Ser. No. 107,603
7 Claims. (Cl. 204—193.2)

The present invention relates generally to the neutronic reactor art. More particularly, it relates to improved reflectors for neutronic reactors.

Many materials undergo dimensional changes when exposed to fast neutrons. When these materials are subjected to a non-uniform fast neutron flux, the resulting dimensional changes are also non-uniform and internal stresses are, consequently, created in the same manner that internal stresses are created by a non-uniform temperature distribution. Just as glass cracks when subjected to a large temperature gradient, certain reactor materials are susceptible to similar damage when subjected to a fast neutron flux gradient for a sufficient length of time.

It was discovered only recently that graphite undergoes shrinkage when exposed to a fast neutron flux at temperatures exceeding approximately 450° F. In any finite reactor, the magnitude of the fast neutron flux is non-uniform in both the axial and radial directions, with the greatest rate of change occurring in the reflector regions of the reactor. Since the magnitude of this shrinkage is proportional to the magnitude of the fast neutron flux, a non-uniform flux across a graphite reflector induces a non-uniform shrinkage therein. The thus-induced differential shrinkage produces stresses in the graphite of the reflector, which stresses will, upon reaching sufficient magnitude, cause extensive damage.

Gas-cooled, graphite-moderate reactor cores generally comprise stacks of uniform, right prismatic graphite blocks arranged in layers, each block being penetrated, either vertically or horizontally, by one or more fuel-coolant channels. Until the present invention, reflectors for reactors of this type have been merely unfueled extensions of the core blocks, the top and bottom reflectors being merely unfueled layers of graphite blocks and the side reflector being formed by vertical stacks of unfueled graphite blocks, with coolant channels being provided where needed. Since the cores of these reactors are usually formed from right prismatic blocks having a width equal to the lattice spacing or some multiple thereof, square-cross-section blocks having transverse dimensions from 4 inches by 4 inches to 16 inches by 16 inches have become more or less standard in the art.

As was previously stated, the rate of decrease in the magnitude of the fast flux is greatest in the reflector. Therefore, the reflector blocks mentioned above are subjected to a large differential flux and consequently to a large differential shrinkage. Thus, in blocks which are aligned with their major axes perpendicular to the reflector-core interface—for example, in the top and bottom reflectors where the major axes of the blocks are oriented vertically—the differential transverse shrinkage causes each of such blocks to assume a tapered shape, the smaller end of which is located at the reflector-core interface. This shrinkage produces a tensile stress in the fibers in the longitudinal surfaces of the blocks which increases with neutron exposure until fracture occurs. Similarly, in blocks which are aligned with their major axes parallel to the reflector-core interface—for example, the side reflector where the major axes of the blocks are oriented vertically—differential shrinkage causes severe bowing which will ultimately lead to fracture of the blocks on the surfaces which are farthest away from the core.

Thus, it is the general object of the present invention to provide a novel graphite reflector for a gas-cooled neutronic reactor in which differential-shrinkage-induced stresses are substantially reduced.

Other objects of the invention will become apparent from the following description of the invention and the drawings appended hereto, wherein.

Figure 1:
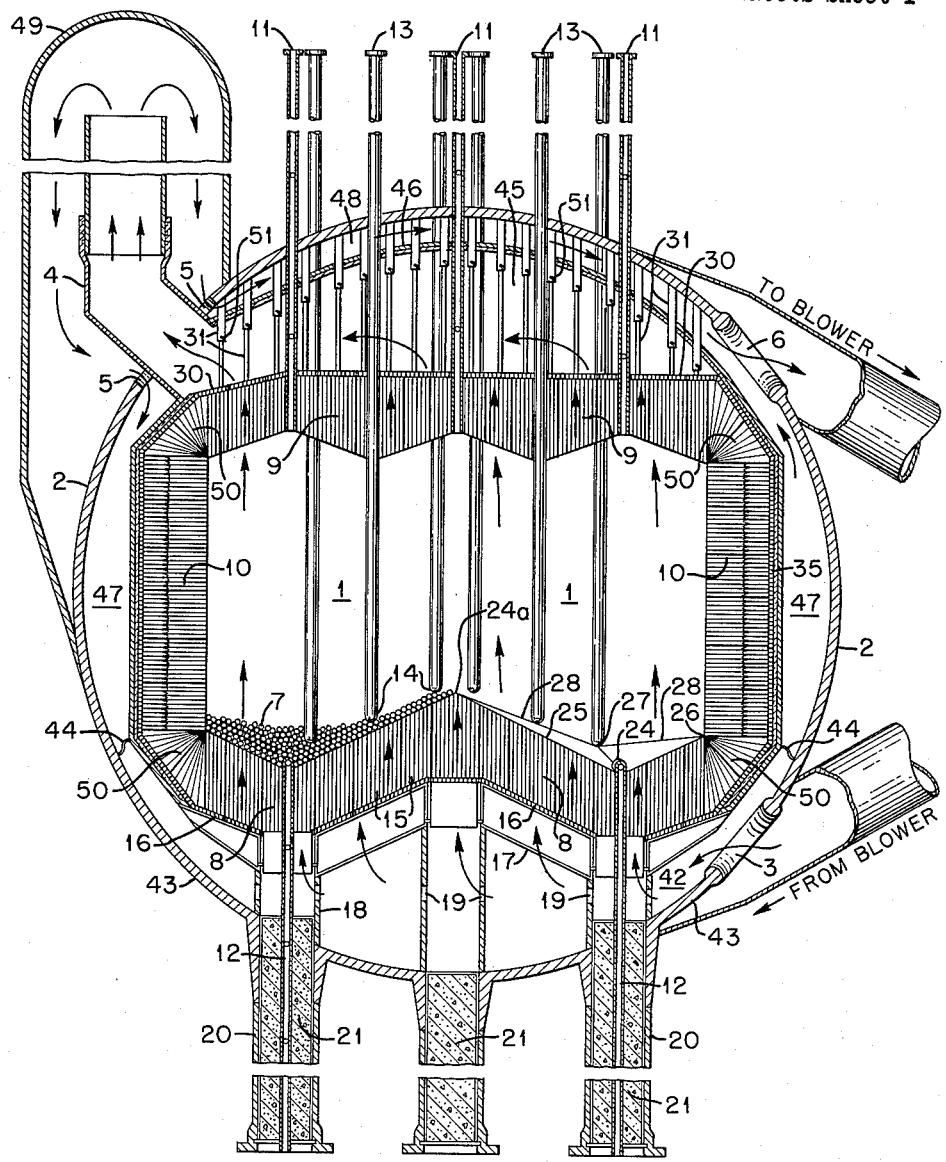
FIG. 1 is a sectional view, in elevation, of a reactor having a reflector designed according to the present invention.

In accordance with the principles of the present invention, the above object is attained by providing a reflector comprising an assembly of closely packed rods disposed with their major axes substantially perpendicular to the interface between the core and the reflector. Each rod is round in transverse cross section at at least its interface end and is provided, at that end, with a coaxial, inwardly tapering hole.

When the reflector must provide a path for coolant flow, the above-mentioned rods are round in cross section (preferably circular) for their entire lengths, the space between the closely packed round rods thus affording a flow passage area for the reactor coolant. When the reflector need not provide a coolant flow path, only the inner portion of each rod on the core-reflector-interface end is round, the outer end of the rod being rectangular in cross section to reduce neutron leakage and to prevent loss of coolant. In general terms, the round configuration of the rods and the central holes should extend into the reflector at least as far as the steeply sloping portion of the fast flux curve across the reflector.

The above-described reflector is superior (i.e., induced stresses are smaller) to any prior reflector, if the comparison is made on the basis of equal size. With respect to size of the rods, it is preferred that the rods be less than four inches in their greatest transverse dimension.

The reduction in stress concentration over prior reflector blocks of equal size afforded by the present invention results from three factors; namely, placing the major axis of the blocks perpendicular to the core interface, the round rod cross section at the interface end, and the inwardly tapering hole, all of which are provided in the region of the greatest fast-neutron-flux gradient. With respect to stresses created by equal fast-flux gradients, a round cross section is inherently superior to a rectangular shape. As to the inwardly tapering hole, it produces a dual effect; namely, a reduction in stress in the high-flux-gradient region of the reflector resulting from a thinner cross section and, secondly, a flatter fast neutron flux profile which results from the lower moderator concentration effected by removal of moderator material from the reflector in creating the hole.

Reflectors constructed in accordance with the principles of the present invention are advantageous over prior reflectors for several reasons. First, the bored, round-rod configuration, as compared to a rectangular or square configuration, is characterized by a much smaller stress concentration factor under the influence of an equally non-uniform, fast-neutron flux. Secondly, the closely packed array of round rods allows a reduction in graphite block size without incurring an undesirable reduction in area for coolant flow. Thirdly, as will be more fully illustrated below in connection with the description of one embodiment of the invention, the reflector, although useful and advantageous in all types of gas-cooled reactors, including the reactor disclosed in the application of common assignee, Serial No. 725,458, filed March 31, 1958, in the names of Julius Foster, Arthur P. Fraas and Alfred M. Perry, for "Gas-Cooled Neutronic Reactor," is particularly advantageous when used with a pebble-bed reactor. Fourthly, as will also be illustrated below, the closely packed configuration lends itself to support by a metallic grid, thus allowing the reflector to be installed in removable sections and the reflector to expand and contract as a unit in response to thermal changes as if it were fabricated from the metal used in the supporting grid. Thus, a reflector can be provided which responds to temperature changes to the same degree as does the structural material used elsewhere in the reactor.

At any given time during the lifetimes of a reflector designed according to the present invention and a prior reflector which is a mere unfueled extension of the core, the stress in the present reflector will be less than 25 percent of the stress in the prior reflector. Thus, the stress at which fracture will occur will be reached much sooner in prior reflectors than in the present reflector.

To illustrate the invention in greater detail, reference is made to the drawings, initially to FIG. 1, which is a vertical cross-sectional view of a reactor containing a reflector constructed according to the present invention. A substantially cylindrical rector core 1 is enclosed by a spherical pressure shell 2 which is provided with a cool-gas inlet 3 from a blower (not shown), a hot-gas outlet 4 to a load such as the schematically illustrated steam generator 49, a concentric cool-gas return orifice 5, and a cool-gas return outlet 6 to the low pressure side of the blower. Core 1 is made up of a multiplicity of small-diameter graphite spheres containing a fissionable material such as $U^{235}$, a portion of which are indicated by reference numeral 7. A lower reflector 8, an upper reflector 9, an annular-shaped side reflector 10, and wedge-shaped corner reflectors 50 define the outer limits of the core, lower reflector 8 serving additionally as a support for fuel spheres 7. Fuel is loaded into the core through a multiplicity of upper-reflector-penetrating loading tubes 11 and is removed through outlet tubes 12 which penetrate lower reflector 8. Penetrating pressure vessel 2 and upper reflector 9 are a multiplicity of graphite tubes 13, the lower ends 14 of which are closed. These tubes serve as guides for conventional absorption-type control rods.

Lower reflector 8 comprises a multiplicity of closely packed, two-inch-diameter, cylindrical graphite rods 15, which are secured at their lower ends to a steel reflector grid 16. Grid 16 is in turn supported by a supporting grid 17 which is carried by pressure-vessel-supported tubes 18. It will be noted that supporting tubes 18 are provided with a multiplicity of apertures 19 adapted to provide coolant gas to the core regions above the interiors of the tubes. The interior of each supporting tube 18 communicates with the interior of an associated access tube 20, which is provided with a removable shield plug 21. Thus, the interior of pressure vessel 1 is rendered accessible to facilitate replacement and/or repair of the core or any component thereof.

Figure 2:
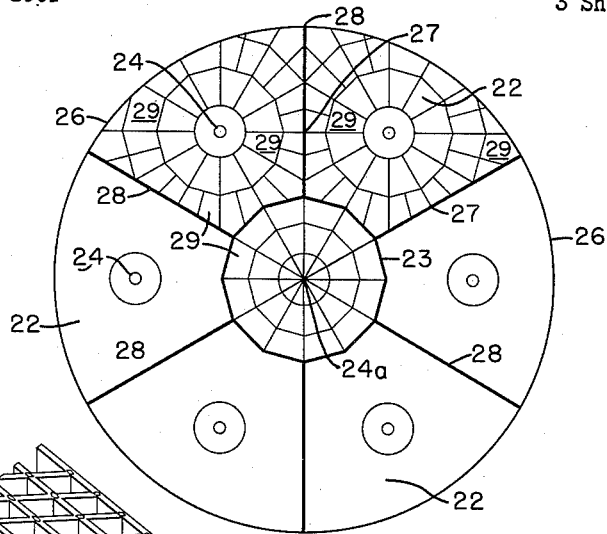
FIG. 2 is a plan view of the bottom reflector of that reactor.

Referring now to FIG. 2 conjunctively with FIG. 1, FIG. 2 being a plan view of lower reflector 8, it can be seen that the lower reflector is divided into seven segments—six peripheral segments 22 and one central segments 23—each of which is supported and serviced from below by a supporting tube 18 and an access tube 20 located under the center 24 of each segment. As may be seen from FIG. 1, lower reflector 8 slopes downwardly away from the center 24a of central segment 23 and from the periphery 26 of the core toward a low point at each center 24 of each peripheral segment 22 along radially-oriented valleys 25. The reflector surface also slopes downwardly—although not as steeply as along valleys 25—from the reflector periphery 26 and center 24a to low points 27 located along radial ridges 28. Thus, the surface of each peripheral segment 22 slopes downwardly from all directions toward its center 24, thereby facilitating the draining and removal of fuel spheres 7 through removal tubes 12.

Although unnecessary for operation of the reactor, the seven segments of bottom reflector 8 may be further subdivided into smaller independent segments 29, each of which comprises a cluster of closely packed reflector rods attached to a segment of grid. Such an arrangement is highly advantageous because each small segment 29 may be removed by remotely operated apparatus from its position in the reflector through its associated supporting tube 18 and access tube 20.

Returning to FIG. 1, top reflector 9 is similar to bottom reflector 8 comprising a multiplicity of closely packed, two-inch-diameter, cylindrical graphite rods secured at their upper ends to a steel grid 30 which is in turn suspended from the top of pressure vessel 1 by hangers 31. Top reflector 9 is similar in plan to lower reflector 8; therefore, reference is again made to the plan view of lower reflector 8 shown in FIG. 2. Upper reflector 9 is also divided into seven segments—six peripheral segments 22 and central segment 23. In elevation, however, upper reflector 9 differs somewhat from lower reflector 8 in that the reflector surface of each segment including center segment 23 slopes upwardly toward a high point at the segment center 24 where fuel loading tubes 11 penetrate the reflector.

As in the lower reflector 8, upper reflector 9 may also be subdivided further into smaller segments 29, each of which may be suspended on one hanger 31 provided with a bayonet joint 51 to allow removal of the segment. Access to the upper reflector may also be had through supporting tubes 18 and access tubes 20.

Figure 3:
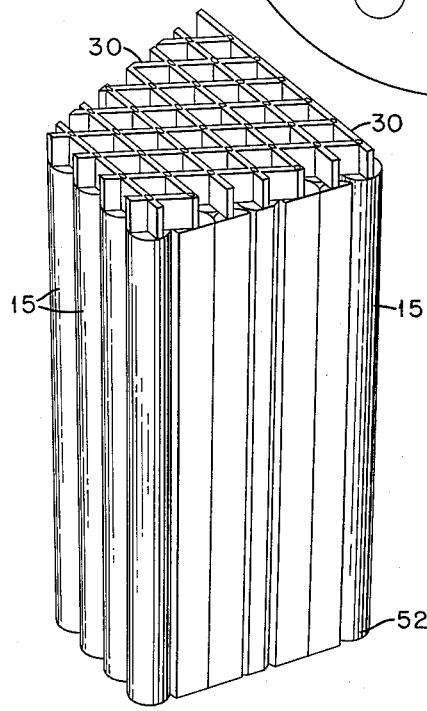
FIG. 3 is a detailed isometric view of a rod cluster from the top reflector.
Figure 4:
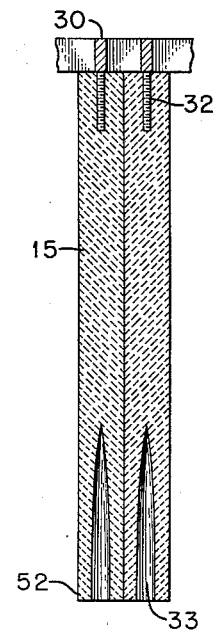
FIG. 4 is a vertical sectional view of two rods from that cluster.

Turning now to FIGS. 3 and 4, which are, respectively, an isometric view of a typical section of the top reflector and a cross-sectional view of two rods from that section, a multiplicity of closely packed cylindrical graphite rods 15 are suspended from a steel reflector grid 30 by means of threaded studs 32. Each rod 15 is provided at its free end 52—that end being the end nearest to the reactor core—with a centrally located, inwardly tapering hole 33. The rods of lower reflector 8 are identical to those in upper reflector 9 except that they point upwardly and are supported from below by grid 16 (see FIG. 1).

Figure 5:
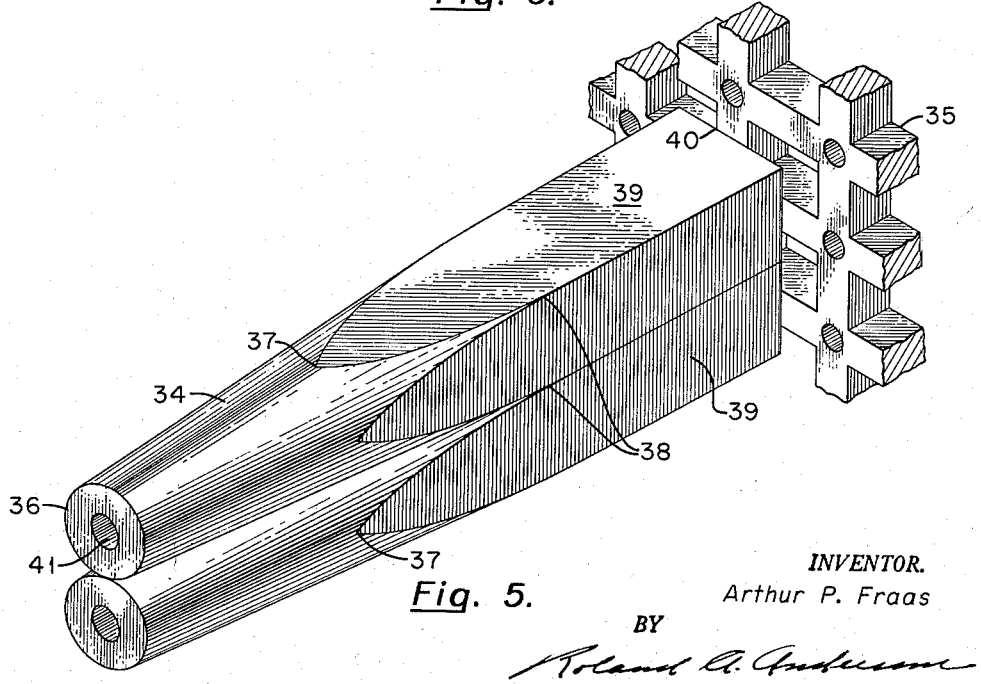
FIG. 5 is a view of two adjacent rods from the side reflector of that reactor; and, FIG. 6 is a diagram showing a typical fast flux curve across a reflector.

Referring now conjunctively to FIG. 5, which is an isometric view of one reflector rod from annular side reflector 10, and to FIG. 1, side reflector 10 comprises a multiplicity of closely packed graphite rods 34 attached at one end to a steel reflector grid 35, their free ends 36 pointing radially toward the center of the reactor. Each rod 34 is circular in cross section at its inner end 36 (the diameter being two inches). The horizontal midplane of the rod is trapezoidal in shape, having sides which are radial with respect to the cylindrical reactor core. In cross section at its longitudinal vertical midplane, the rod is rectangular, the height being constant from end 36 to end 40. Between end 36 and a vertical plane located at 37, the rod is elliptical in cross section, the minor axis (i.e., the vertical axis) remaining constant at a value equal to the diameter of circular end 36 and the major axis (i.e., the horizontal axis) increasing as the distance between the radially-oriented sides of the horizontal midplane increases. Between the vertical plane 37 and a vertical plane located at 38, the cross section of the rod changes from an ellipse to a rectangle in order to provide a completely closed gas-tight reflector. Sides 39 of the rod continue to diverge radially from plane 37 to end 40. As in the rods of the top and bottom reflectors, an inwardly tapering hole 41 is provided at core-reflector-interface end 36.

Corner reflectors 40 comprise a multiplicity of wedge-shaped pieces of graphite attached to an extension of grid 35. Alternately, the corner reflectors may be a continuation of annular side reflector 10. The wedge-shaped configuration shown is, however, preferred because the thin cross section of the wedges in the region adjacent to the core, that being the region of high differential fast neutron flux, minimizes differential shrinkage.

As was stated above, in general terms, the round configuration of a rod designed according to the present invention should extend into the reflector from the core-reflector interface through at least the steepest portion of the fast flux curve across the reflector. Generally, this point is reached when the fast flux has declined to a value of 10 percent or less of its value at the core-reflector interface. Of course, if it is desired to circulate a coolant through the reflector to the core, the entire reflector rod should have a round configuration, preferably cylindrical, as is illustrated by the top and bottom reflectors of the reactor described herein.

Likewise, although the inwardly tapering hole which is provided in the interface end of the rod will effect an improvement irrespective of its depth, it is generally desired, as with the round configuration of the rod, that the hole be extended to a depth where the fast flux gradient has been substantially dissipated. Other considerations such as moderator density may dictate that the tapering hole be carried a lesser distance into the rod. Nevertheless, a reduction in stress concentration, as compared to a solid rod, will be effected by such a hole.

Figure 6:
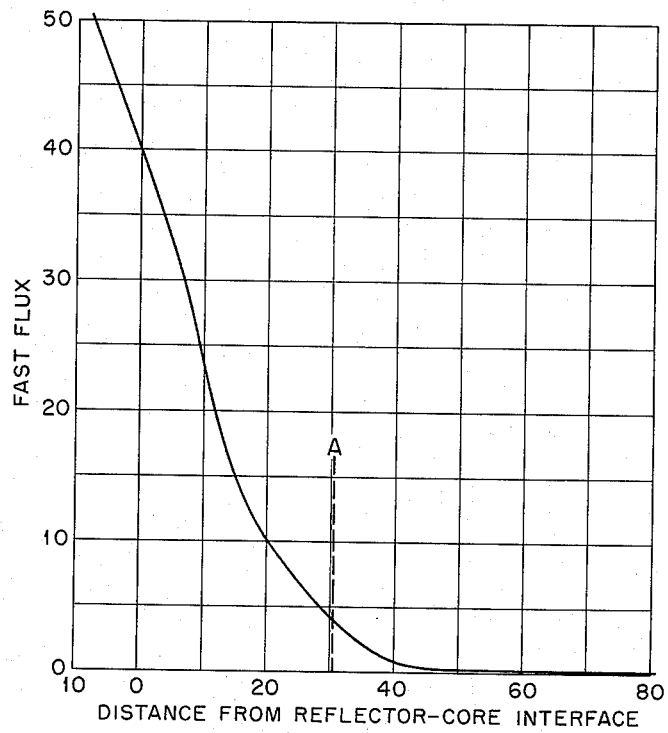

FIG. 6, which is a typical fast flux curve across a reflector, illustrates the principles discussed above. Distance into the reflector from the reflector-core interface is plotted in arbitrary units on the abscissa, and fast neutron flux (i.e., neutrons having an energy greater than 0.1 mev.), also in arbitrary units, on the ordinate. In a rod designed according to the present invention, the round configuration would be carried through the very steep portion of the curve to at least the depth indicated by dotted line A. The inwardly tapering hole would also be as near to that depth as possible consistent with other factors such as moderator density.

Returning now to FIG. 1, when the reactor is in operation, an exteriorly located blower delivers a gaseous coolant through inlet 3 into an inlet plenum 42 which is defined by bottom reflector 8, the lower portion 43 of pressure vessel 2, and a circular baffle 44. Thus, the inlet gas stream is directed upwardly through bottom reflector 8, core 1, and top reflector 9 as is indicated by the arrows. After traversing top reflector 9, the gas enters a hot-gas plenum 45, which is defined by a thermally-insulated baffle 46, and is directed thereby to steam generator 49 through outlet 4. After being cooled in steam generator 49, the gas is returned to the interior of the reactor through concentric inlet 5. The thus-returned cool gas flows through the space 47 around the periphery of side reflector 10, and over the top of hot-gas plenum 45 through space 48 to outlet 6 which communicates with the low-pressure side of the blower.

Since many modifications of and deviations from the embodiment disclosed herein may be made without departing from the spirit and scope of the present invention, the foregoing illustrative description of the embodiment should not be interpreted in a limiting sense. It should be apparent that reflectors designed in accordance with the present invention may be fabricated from any suitable material and may be applied to all types of reactors. Thus, the invention should be limited only by the claims appended hereto.

Having thus described the invention, what is claimed is:

1. In a neutronic reactor having a core and a reflector disposed adjacent to said core, the improved reflector which comprises a multiplicity of closely packed graphite rods disposed with their major axes substantially perpendicular to the interface between said core and said reflector, each of said rods being substantially round in transverse cross section at at least its end adjacent to said interface and provided at said end with a coaxial, inwardly tapering hole.

2. In a neutronic reactor having a core and a reflector disposed adjacent to said core, the improved reflector which comprises a multiplicity of closely packed cylindrical graphite rods disposed with their major axes substantially perpendicular to the interface between said core and said reflector, each of said rods being provided at its end adjacent to said interface with a coaxial, inwardly tapering hole.

3. In a neutronic reactor having a core and a reflector disposed adjacent to said core, the improved reflector which comprises a multiplicity of closely packed graphite rods disposed with their major axes substantially perpendicular to the interface between said core and said reflector, each of said rods being substantially round in transverse cross section at its end adjacent to said interface and rectangular in transverse cross section at its other end, and provided at its end adjacent to said interface with a coaxial, inwardly tapering hole.

4. In a neutronic reactor having a core, a reflector disposed adjacent to said core, and a fast-neutron-flux gradient across said reflector, the improved reflector which comprises a multiplicity of closely packed graphite rods disposed with their major axes substantially perpendicular to the interface between said core and said reflector, each of said rods being substantially round in transverse section from said interface to a depth within said reflector where the magnitude of said fast neutron flux is less than ten percent of its magnitude at said interface, and rectangular in transverse cross section from said depth to its other end, each of said rods being provided at its end adjacent to said interface with a coaxial, inwardly tapering hole.

5. The improved reflector of claim 1 wherein the diameter of said rods is less than four inches.

6. The improved reflector of claim 4 wherein the greatest transverse dimension in said round portion of each of said rods is less than four inches.

7. In a neutronic reactor having a vertically-oriented right cylindrical core region, an annular shaped side reflector, and top and bottom reflectors adapted to conduct a flow of coolant, the improved reflector structure which comprises a multiplicity of closely packed graphite rods disposed with their major axes substantially perpendicular to the interface between said core and said reflector, each of said rods being provided with a coaxial, inwardly tapering hole at its end adjacent to said interface, said top and bottom reflector rods being cylindrical in shape to facilitate coolant passage therebetween, and said side reflector rods being substantially round in transverse cross section at their ends adjacent to said core-reflector interface and rectangular in transverse cross section at their opposite ends, said rectangular ends serving to reduce neutron leakage and prevent loss of coolant.

References Cited in the file of this patent

UNITED STATES PATENTS

| | | |
|---|---|---|
| 2,824,056 | Leverett | Feb. 18, 1958 |
| 2,879,216 | Hurwitz et al. | Mar. 24, 1959 |

FOREIGN PATENTS

| | | |
|---|---|---|
| 821,607 | Great Britain | Oct. 14, 1959 |
| 835,764 | Great Britain | May 25, 1960 |
| 222,480 | Australia | June 22, 1959 |